US008694599B2

(12) United States Patent
Sentinelli et al.

(10) Patent No.: US 8,694,599 B2
(45) Date of Patent: Apr. 8, 2014

(54) METHOD AND SYSTEMS OF DISTRIBUTING MEDIA CONTENT AND RELATED COMPUTER PROGRAM PRODUCT

(75) Inventors: Alexandro Sentinelli, Milan (IT); Andrea Lorenzo Vitali, Bergamo (IT); Alessandro Cattaneo, Ciserano (IT)

(73) Assignee: STMicroelectronics S.R.L., Agrate Brianza (MB) (IT)

( * ) Notice: Subject to any disclaimer, the term of this patent is extended or adjusted under 35 U.S.C. 154(b) by 518 days.

(21) Appl. No.: 12/980,883

(22) Filed: Dec. 29, 2010

(65) Prior Publication Data

US 2011/0161457 A1  Jun. 30, 2011

(30) Foreign Application Priority Data

Dec. 30, 2009  (IT) .............................. TO2009A1056

(51) Int. Cl.
*G06F 15/16* (2006.01)
(52) U.S. Cl.
USPC ............................ 709/217; 709/218; 709/219
(58) Field of Classification Search
USPC ......................................................... 709/217
See application file for complete search history.

(56) References Cited

U.S. PATENT DOCUMENTS

| 8,145,780 | B2 * | 3/2012 | Katis et al. .................... 709/231 |
| 2006/0294512 | A1 * | 12/2006 | Seiden ......................... 717/168 |
| 2008/0192661 | A1 * | 8/2008 | Hamamoto et al. .......... 370/310 |
| 2009/0265141 | A1 * | 10/2009 | Aly et al. ..................... 702/188 |
| 2009/0300673 | A1 * | 12/2009 | Bachet et al. .................. 725/31 |
| 2010/0057934 | A1 * | 3/2010 | Ratica ......................... 709/240 |

OTHER PUBLICATIONS

Rubin Lino Villa: "*Digital Fountain Codes for Peer-To-Peer Networks*", Thesis, Polytechnic of Milan, Milan, Italy, Mar. 2008.
Noam Singer: "*Erasure Correcting Techniques for UDP and Peer-to-Peer System*", Thesis, Ben-Gurion University of the Negev, Beersheba, Israel, Feb. 2005.
Chuan Wu et al.: "*rStream: Resilient and Optimal Peer-To-Peer Streaming With Rateless Codes*", IEEE Transactions on Parallel and Distributed Systems, IEEE Service Center, Los Alamitos, CA, US, vol. 19, No. 1, Jan. 1, 2008, pp. 77-92.
Thomos N et al.: "*Collaborative Video Streaming With Raptor Network Coding*", Multimedia and Expo, 2008 IEEE International Conference on, IEEE, Piscataway, NJ, US, Jun. 23, 2008, pp. 497-500.
Jeff Castura et al.: "*Rateless Coding for Wireless Relay Channels*", IEEE Transactions on Wireless Communications, IEEE Service Center, Piscataway, NJ, US, LNKD-DOI:10.1109/TWC.2007.360364, vol. 6, No. 5, May 1, 2007, pp. 1638-1642.

* cited by examiner

*Primary Examiner* — Glenton B Burgess
*Assistant Examiner* — Angela Nguyen
(74) *Attorney, Agent, or Firm* — Allen, Dyer, Doppelt, Milbrath & Gilchrist, P.A. Attorneys at Law

(57) ABSTRACT

Information codes are arranged in pieces comprised of chunks of bytes over a network, such as a Peer-to-Peer overlay network, including a set of peer terminals. A first peer identifies missing chunks in the received pieces and requests such missing chunks from other peers. The chunks are subjected to a fountain code encoding wherein the chunks in a piece are X-ORed. The first peer is therefore capable of reconstructing a received piece encoded with fountain codes from a combination of linearly independent chunks corresponding to the piece. The chunks are transmitted over the network with a connection-less protocol, without retransmission of lost packets, preferably with a UDP protocol.

24 Claims, 4 Drawing Sheets

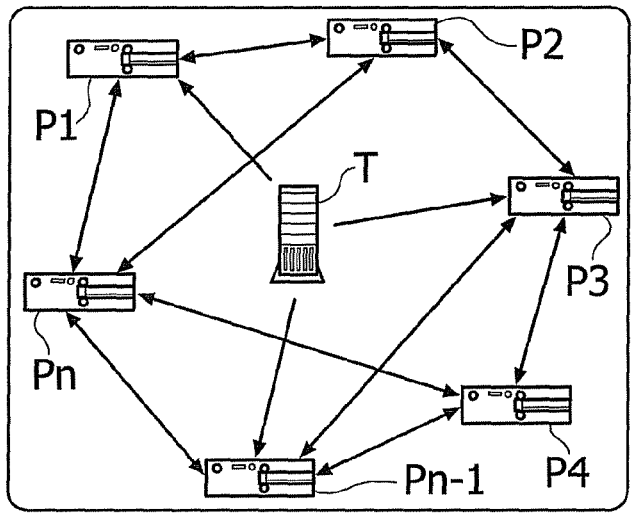
FIG. 1
(PRIOR ART)
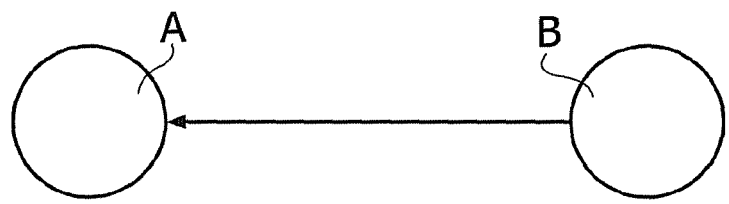
FIG. 2
(PRIOR ART)
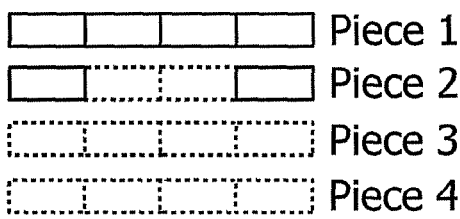
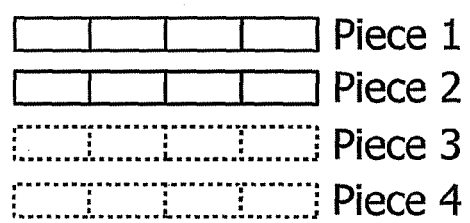
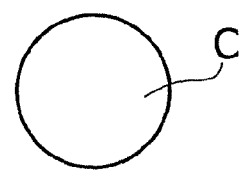
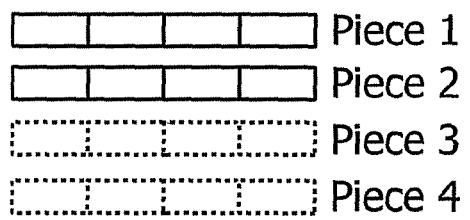

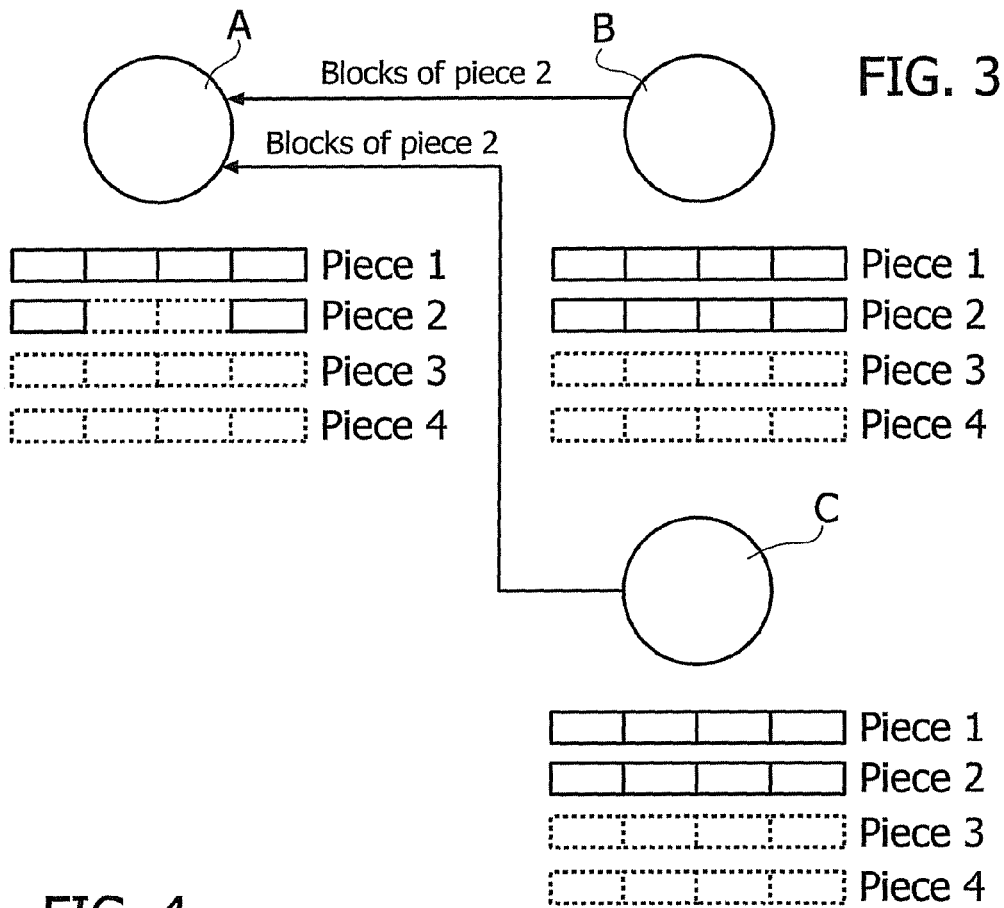
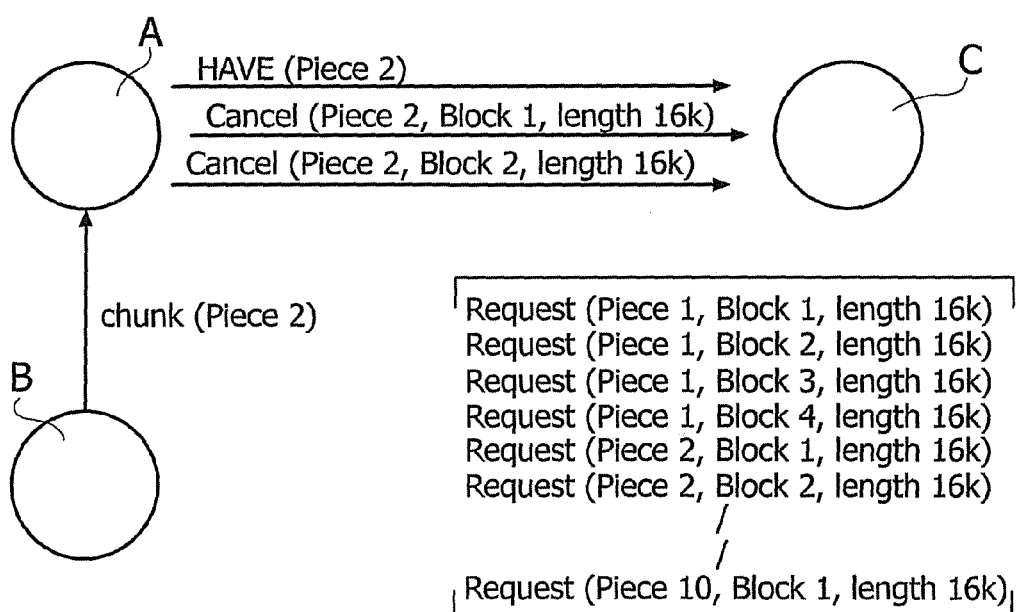

METHOD AND SYSTEMS OF DISTRIBUTING MEDIA CONTENT AND RELATED COMPUTER PROGRAM PRODUCT

FIELD OF THE INVENTION

This disclosure relates to networks for distributing media contents. In addition, this disclosure was devised with specific attention paid to its possible application in Peer-to-Peer (P2P) networks.

BACKGROUND OF THE INVENTION

P2P systems are presently successful at a commercial level and are normally included in devices such as, for example, Set Top Boxes. P2P applications, both of a file-sharing and of a streaming nature, rely on infrastructure developed by several users organized in an overlay network. Although the Internet Protocol supports multicast distribution (i.e. data distribution to a group of IP addresses), P2P systems create the network and manage the content distribution, at application layer. The overlay can be created and managed in ways dependent on the nature of the application. In general, contents are split in chunks and then re-assembled at client side in the right order.

In the case of "file sharing," a whole file is downloaded and then played offline, without constraints in terms of bandwidth or time delay. "Video on demand" streaming instead starts playback while the file is being downloaded, dealing with bandwidth and time constraints. The same is true for "live streaming", where however peers are not usually sharing the whole content (it is not available yet) but just a small buffer of data close to the content production and playback time.

This disclosure will focus on file-sharing, although the proposed features may apply in general also to streaming applications. The protocol known as BitTorrent is adapted to share files more rapidly as compared to traditional P2P programs. BitTorrent is a program which was developed as open source; therefore, many different versions of the program are available, having the same protocol specification and the same basic code that can be used to share files.

With the architecture schematically represented in FIG. 1, which shows a so-called "swarm" of peer terminals P1, P2, . . . , Pn in a P2P network, each user, through the information contained in a small file with .torrent extension, can access a tracker T1, i.e. simply a server that ensures communication among the several peers. Tracker T1 is the critical element in the communication, because the peers themselves must start downloading. Moreover, the peers who have already started downloading periodically contact the tracker T1, in order to negotiate the bits exchange with the new peers who may have joined the network and in order to perform the diffusion of statistic information indicative of the traffic features and of the trustiness of the above mentioned peers. In any case, after the initial reception of a bit of file data, the peer can continue the communication and the exchange with or without the tracker T1. The tracker T1 may also be comprised by the web server W1, wherein the list of available Torrent files is stored. For the end user, it is sufficient to click the file he/she wants to download. W1 and T1 are, from the point of view of functionality, two separate entities which are adapted respectively, to show the list of downloadable files and to host the Torrent files (W1), and to download the information of the swarm peers (T1) However, they may often coincide and reside in one web server W1, where both the torrent file list and the tracker T1 reside.

First of all, the peer looks up, from the web interface of W1, the list of available Torrent files, so it chooses the Torrent. This Torrent file is obviously not the actual file that the user wishes to download, but, rather, is a small sized file indicating which of all the other terminals in the network have the file available. Once the Torrent file has been downloaded and run by the P2P program (adapted to the BitTorrent version available on the user's terminal), the tracker T1 is contacted in order to download the list of users belonging to the swarm and to start downloading.

In this respect, BitTorrent distinguishes between two different types of peers. In particular, a "seed" is a peer that has a complete copy of the file to be distributed. On the contrary, a "leecher" is a user or terminal that has bits of it. With BitTorrent, users allow the upload of the file that they are currently downloading from other users. A user will finish downloading a certain bit of a full file, and will automatically send it out to other users. In detail, a file is made up of bits (sometimes named chunks) comprising 16 KB blocks. Each peer notifies the possession of one bit, and sends single 16 KB blocks of the chunk when the peer requests them. The peer requests blocks and notifies the possession of chunks.

BitTorrent offers the advantage not to require these pieces or bits to be downloaded in sequence. The possible appearance of bottlenecks in bandwidth is a problem that on the contrary affects other programs, such as Bearshare. This means that most users of a traditional P2P program do nothing but downloading: when a file is shared, many different users may try to be loading the same file at the same time, and this creates a bottleneck in bandwidth, because there is a lot of traffic trying to get to the same file simultaneously from one source.

BitTorrent requires little bandwidth from the initial source of the file to be distributed: once the small Torrent file has been made available, the peers using BitTorrent are pointed to all the seeds and the peers that can provide file chunks, and perform their work by sharing every individual bit of information they have downloaded. This swarm technique in FIG. 1 allows multiple parallel downloads, because different chunks of the file can be simultaneously downloaded from different clients. When a terminal has completed the download, it informs all peers to which it is connected through a HAVE message, so that they can automatically upload it.

The BitTorrent program currently follows two basic rules. First, a user's BitTorrent sends data to peers that have previously sent data to it, creating a give and receive relationship. Second, the peer limits the number of uploads to four, and continuously looks for the best four peers from which to download.

This process is implemented with a "choke/unchoke" policy. Choking is when a terminal temporarily refuses to let another peer upload a content. However, the user's connection is not closed, and other parties can still upload data from that machine. A leecher will service the four fastest uploaders and choke the rest. Once the file has been completely downloaded, the client is considered a seed until the connection to the other peers is stopped and that peer is removed from the users' BitTorrent program, in practice by subtracting from the user the informative file detained by the tracker and by no longer showing this file as available for a certain file downloading.

The effectiveness of this data exchange mechanism depends largely on the policies that clients use to determine to whom data must be sent. Clients may prefer to send data to peers that send data back to them (a "tit for tat" scheme), which encourages fair trading. But excessively strict policies often result in suboptimal situations: for example, newly joined peers may be unable to receive data because they do not have any pieces to trade, or two peers having a good mutual connection may not exchange data simply because neither of them takes the initiative. In order to counter these effects, an official BitTorrent client program uses a mechanism known as "optimistic unchocking", whereby the client reserves a portion of its available bandwidth for sending pieces to random peers (not necessarily known as good partners, the latter being called preferred peers) in the hope of discovering even better partners and to guarantee to the newcomers a chance to join the swarm.

In the general context of numeric communication, techniques are also known which bear the name of FEC (Forward Error Correction). In order to protect the data sent from a source to a receiver, FEC technologies involve encoding algorithms that add to the source data some degree of redundancy, i.e. additional repair data, in forming the encoded data. The decoding algorithm complementing a specific encoding algorithm allows the receiver to detect and in case to correct errors in the received data, solely on the basis of the received encoded data. The error correction action is "forward" in the sense that no feedback from the receiver to the sender or further transmission by the source are required. The additional redundancy introduced by FEC techniques implies that more information than just the original data is transmitted, resulting either in a longer transmission time (if the data rate is kept constant) or in a faster data rate and therefore in higher bandwidth occupancy (if the transmission time is kept constant).

Paradoxically, however, the additional redundancy can ultimately save transmission time and bandwidth use, if one considers the possible retransmissions that would be necessary without FEC. In applying FEC techniques, a basic tradeoff is achieved between the degree of error protection provided by a particular algorithm, the processing work involved by encoding and decoding, the introduced latency and/or overhead, and the bandwidth expansion necessary to protect against errors and data loss.

FEC techniques generally comprise error detection codes, error correction codes and erasure correction codes, adapted to meet different needs. Error detection codes allow the receiver to determine whether the received data are in error, but in general do not provide the means to identify and correct the errors. For example, a 1's complement checksum error detection code is used as a part of IP data packets to allow the receiver in order to check the integrity of the IP header and in TCP (Transport Control Protocol) and UDP (Unit Data Protocol) data packets in order to check the integrity of the header and of payload data.

Error correction codes allow the receiver to identify and correct up to a certain number of errors, occurring in the received data. For example, conventional or block error correction codes are used in the physical layers of 802.11a/b/g Wi-Fi devices and DOCSIS cable modems, in order to compensate for the bit error rates associated with those channels.

Erasure correction codes allow the receiver to correct up to a certain amount of missing data, when the positions of the missing data within the received data are already known. For example, Raptor code can be used in any packet data network in order to recover packets that have been "lost" either because they were never received or because errors were detected and the packets were discarded.

In a packet data network, packet loss is generally due to two reasons. First, the packets may have been discarded along the transmission path, for example because of a network congestion due to heavy traffic. Second, the data corruption may be such that any bit-level error correction code that might be used by the physical or link layer cannot restore the full packet, which is actually lost.

As an erasure correction code, Raptor can be used to provide packet-level protection at the transport layer or higher, increasing the bit-level protection that may be provided by the protocols at physical connection layer and by the use of error detection or error correction codes.

The erasure correction is particularly meaningful when the transport layer is not adapted to guarantee the packet delivery. A protocol such as TCP guarantees the delivery by implementing the mechanism known as ARQ (Automatic Repeat Request), based on timeouts and acknowledgements (ACK). However, the timeouts and round-trip-times (RTT) involved in the ARQ and ACK messages add on delay during the file download.

It is therefore very expensive to manage TCP connections, because connections are set up slowly and operating systems usually allow only for a limited number of TCP connections which, if the peer is unlucky, may refer to multiple slow or congested peers.

On the contrary, a UDP protocol does not guarantee the packet delivery, because it is a best-effort protocol. There are no timeouts or ARQ/ACK messages. The protocol is therefore very light and fast, and this is the reason why it is used in low-latency applications, such as streaming and VoIP.

UDP is a connection-less protocol, wherein the exchange of data between source and receiver (or receivers) does not require the preventive creation of a circuit, either physical or virtual, over which the whole data flow is directed, in a predetermined and sequential order.

UDP connections are set up quickly, and many connections may be active at a given time; as a consequence, within this set of connections there may be a sub-set of fast peers which can help downloading the file very quickly.

The UDP protocol does not manage the reordering of packets or the retransmission of lost packets, and therefore it is generally considered as less reliable. UDP provides basic services at transport layer, i.e. connection multiplexing through a gate mechanism, and error check through a checksum, inserted in a field of the packet heading.

The erasure recovery technology is useful to allow the implementation of many fast and light UDP connections, enabling the peers to download at the fastest possible speed.

Another aspect, which is still debated in literature, concerns whether it is preferable to adopt a "push" approach, wherein peers are suggested to send data without waiting for specific requests. In a well-known and stable tree-structure delivery network, it is possible to reduce the amount of overhead messages which communicate what to download. The more stable the overlay is, the less the need is felt to have policy messages generating a complex and redundant overhead. It is possible to properly foresee the data chunks that peers will request in the near future, without having to send block requests; the supplier simply sends the blocks in order, therefore "pushing" data chunks into the overlay network.

On the other hand, if the overlay network is widely affected by a free riding behaviour, peers frequently look for new neighbours, so that it becomes advantageous to make individual peers more independent from one another in terms of global management. An excessively structured overlay network can be complicated to set up and time consuming if the overlay is frequently destroyed and rebuilt. The flexibility is obtained through an intense signalling message policy. This scenario leads designers to approach P2P applications in a "pull" fashion: the peer asks continuously to receive the content which he currently needs, therefore it retrieves or "pulls" data chunks from neighbours.

The push vs. pull approach is therefore to be evaluated by keeping in mind the need to have more or less overhead and the willingness to accept a lower robustness in comparison with the overlay network changes. Clearly, the optimal choice would be such as to get as much efficiency as robustness.

The techniques based on the codes known as fountain codes have been widely analyzed in literature, and they have been used in telecommunications. The relevant feature of such codes is the ability to retrieve the information from a sufficiently high number of randomly selected packets. This is possible because each chunk of information is spread over all chunks belonging to the same data unit.

Chunks are randomly X-ORed among themselves so that, after the reception of K+few chunks X-ORed with a moderate overhead of 1-2% additional chunks information, it is generally possible to recover the original information. It is substantially a flexible (as many random chunks as needed can be generated on the fly, there is no pre-defined code-rate) and low-complexity (no maths using Galois fields) Forward Error Correction (FEC) technology, that finds application in a streaming scenario, in a distributed file system storage space as well as in a distributed content delivery network, as is the case in P2P networks. In such a context, the technologies based on fountain code encoding can solve the problem of missing/lost blocks when the overlay is strongly affected by free riding behaviour because peers disconnect, change channels, turn off the machine/Set Top Box or, more simply, in case of network congestion.

In a standard Bit Torrent application, a specific data block is needed to complete a data piece. On the contrary, by using fountain code encoding, the system is more robust because it is possible to retrieve the information of a missing block by downloading any combination of blocks X-ORed with the missing one.

In a P2P environment, fountain code technology also addresses the issue of delayed blocks when the peers are slow or congested and/or the network is continuously congested. From this point of view, lost blocks are a special case of delayed blocks: a lost block is a block with infinite delay. By using DF encoding it is not necessary to wait for a specific block from a specific peer. On the contrary any block X-ORed with the delayed one will serve the purpose.

In this respect, the RAPTOR code, which represents the most widespread specific version of the DF encoding, is proprietor but its use has been granted for free after standardization c/o IETF. Other versions of DF are known as well, such as Random Digital Fountain codes, which make it possible to get almost the same performance as Digital Fountains, with a lower decoding complexity.

Objects related to what previously described are discussed for example in the documents "Digital Fountain Codes for Peer-to-Peer Networks" by Ruben Villa, available on the date of filing of the present application at the Internet address http://rubenlinovilla.googlepages.com/Digital fountain codes for P2P Netwo.pdf, and "Erasure Correcting Techniques for UDP and Peer-to-Peer System" by Noam Singer, available on the date of filing of the present application at the Internet address http://www.cs.bgu.ac.il/~singern/ln/studies/research/thesis/NoamSingerThesis.pdf.

SUMMARY OF THE INVENTION

The object of the invention is to overcome the above discussed drawbacks concerning the presently considered content sharing networks (for example P2P networks). According to the invention, such an object is achieved by a method having the features set forth in this disclosure. The invention also relates to corresponding devices, as well as to a computer program product, loadable into the memory of at least one computer and comprising portions of software code adapted to perform the steps of the method when the product is run on at least one computer. As used herein, the reference to such a computer program product is meant to be equivalent to the reference to a computer readable medium, containing instructions for controlling the processing system, in order to coordinate the execution of the method according to the invention. The reference to "at least one computer" aims at highlighting the possibility of carrying out the present invention in a modular and/or distributed form.

Various embodiments provide a new setup of P2P systems, wherein DF codes and UDP protocol are used respectively at application layer and at transport layer.

In various embodiments, the use of fountain codes allows peers not to be forced to request a specific block to active seeders. The DF encoding synergizes with UDP protocol, because peers express their request only once and then the seeders transmit any one of N linear combinations among blocks belonging to one piece, avoiding the packet re-transmission, as it is necessary in TCP protocol.

Various embodiments are adapted to obtain an overhead optimization and to perform a mechanism for loss control for UDP protocol, so as to allow the system to properly work with the DF codes at application layer.

In various embodiments, fountain codes are used together with UDP protocol at a transport layer, with the consequent reduction or elimination of acknowledgement waiting time, as it happens with TCP protocol.

In various embodiments, it is possible to protect the clients (specifically the set of features), which allows to obtain in a particularly efficient way Set Top Boxes adapted to host a P2P engine for video on demand applications.

Various embodiments provide a client starting form the BitTorrent open source project, by implementing the Digital Fountain engine in a modular fashion, which also shows backward compatibility with the old BitTorrent client.

It will however be appreciated that various embodiments can share the same technology and P2P engine. With respect to the error correction function, in various embodiments, when not all encoded symbols have been received because of lost or corrupted packets, it is nevertheless possible to retrieve the source symbols, if a sufficient number of encoded symbols have been successfully received.

The number of encoded symbols which should be successfully received in order to retrieve data completely is slightly higher than the number of source symbols in the source block.

For a decoding algorithm such as Raptor, as a matter of fact, it is not important what specific encoded symbols have been received, or the sequence of their reception; if an encoded symbol has been received, it can be used to retrieve the original data.

In various embodiments, the traditional data driven pull approach is transferred to a scenario wherein peers do not stop sending data chunks, and which is therefore more similar to the push model. Various embodiments are therefore based on a new P2P content sharing policy, halfway between DF codes at application layer and UDP protocol at network transport layer.

Various embodiments, combining the UDP protocol and the fountain code encoding in a P2P environment, can be implemented in an working client, for example on the basis of a BitTorrent open source project.

BRIEF DESCRIPTION OF THE DRAWINGS

The invention will now be described, by way of example only, with reference to the enclosed views, wherein:

FIG. 1 has been previously described, and represents the prior art;

FIGS. 2 and 3 compare an embodiment at end game mode layer, according to the prior art;

FIGS. 4 and 5 again compare the prior art and an embodiment of the present invention at the layer of request erasure procedure and of overhead optimization;

DETAILED DESCRIPTION OF THE PREFERRED EMBODIMENTS

Figure 5:
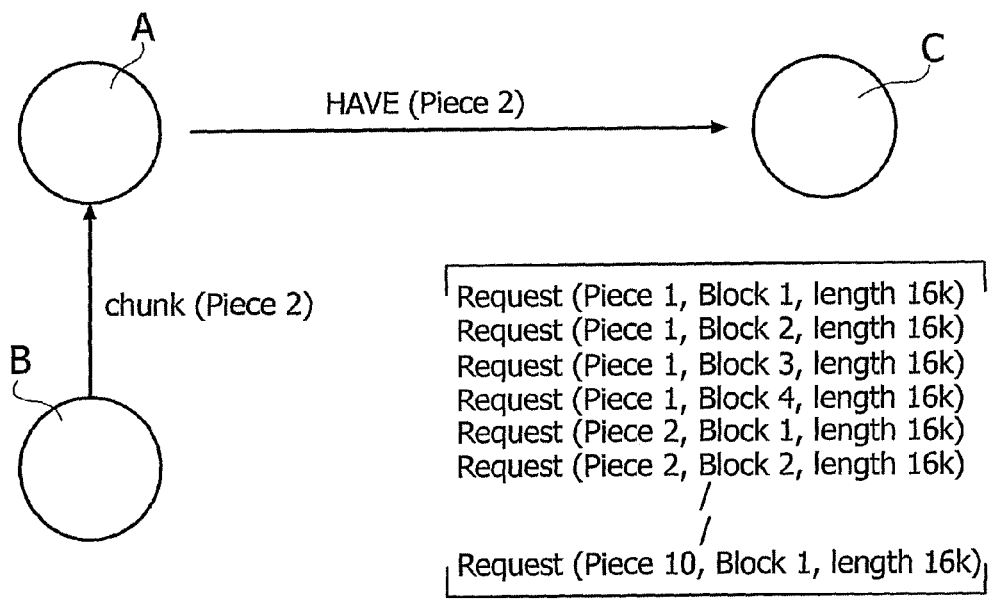

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Most of the present disclosure will be based on a direct comparison between traditional solutions and embodiments.

The context of use of the present invention is represented in FIG. 1 and, as previously mentioned, various embodiments are based on the principle according to which DF codes allow to encode a pseudo-endless series of fountain symbols, starting from a source block of length K.

An implementation of this kind is suitable for the BitTorrent information structure, both in terms of blocks and of pieces. A piece comprises a fixed number of blocks (configurable by the user) which is adapted to be encoded through fountain codes.

In a conventional BitTorrent approach, a piece is reconstructed only when all blocks belonging to one piece have been received. In BitFountain, instead, a piece is "decodable" already when a sufficient number of (linearly independent) coded blocks have been received.

Requests relating to the same piece follow a progression where blocks are pseudo-randomly X-ORed, until the DF matrix is not invertible. This results in an important feature of DF application in a P2P client.

For example, let us consider a piece made of 100 blocks, and let us suppose that, in consequence of a network congestion, the peer wishing to receive this piece has missed block $57^{th}$. In a BitTorrent approach, the client asks again to be sent block $57^{th}$. If on the contrary a DF approach is used, it is possible to send the requests concerning blocks $101^{th}$, $102^{nd}$, $103^{rd}$ and so on (depending on what blocks are missing) avoiding any type of constraint or dependency on specific blocks which the peer has not received. As a matter of fact, since the information is spread, the piece may be decoded directly after the reception of 100 (linearly independent) blocks, whatever their combination may be.

At the receiver side, when the client receives the block, it has the task of filling the DF matrix with the index of the blocks that have been X-ORed at the supplier side. Each block keeps the knowledge of the blocks (the indexes) that have been X-ORed to form the new one. However, these indexes are actually available, because clients use the same number of pseudo-random seeds that generate the index of the X-ORed blocks. As a consequence, it is possible to generate a very high number of encoded blocks in a uniquely progressive fashion.

This mechanism makes the P2P policy exchange more flexible. This flexibility may be appreciated by resorting to an example. If a peer P has a budget of four requests to be done and the peer needs two information blocks of a chunk, the following may happen.

In the classic BitTorrent approach, peer P asks for each chunk twice (for example two peers A and B are asked for the first block and two other peers C and D are asked for the second block). Peer P starts receiving the blocks from each peer; however, not all the received information blocks of the same chunk can be useful; if only peers A and B answer, peer P will receive two copies of the first block, while still lacking the second block.

According to the embodiments, peer P using two information blocks can on the contrary ask for a random generated block four times; in this way, any pair of received blocks can be useful.

In this respect, it should be appreciated that the new Torrent is satisfied as soon as the first two fastest uncongested peers reply; therefore, the download is not blocked or slowed down by slow or congested peers.

Specifically, in the traditional BitTorrent protocol, each block of the chunk being downloaded is requested by the peer that needs it to the seed (or to other peers) through a particular message that requests exactly a particular block of bytes, i.e. the block of bytes related to that particular piece.

On the contrary, by applying fountain codes, there is no worry concerning what specific block of the chunk may be requested, because it is sufficient to have a series of chunk blocks which is long enough to enable the reconstruction of the file.

These considerations are meaningful in various applications, which will be considered in the following, more specifically, end game mode, overhead optimization, request ranking mechanism, and UDP protocol loss control.

Once again, each of these aspects will be dealt with through a comparison between the conventional BitTorrent approach and the solution according to the embodiments, which is based on an integration of fountain codes and UDP protocol.

First of all, let us consider the End-Game mode, i.e. the condition in which the file downloading by a peer P is nearly completed.

In this condition, the last few blocks tend to trickle in slowly: when the peers that have been asked for the blocks are loaded with requests being processed, the client P that has "almost finished" to download the piece (or the whole file) may keep on waiting, and may have no chance to make use of its own available resources.

In order to speed up the process, the client P can send requests concerning the blocks it is still lacking to the peers he has contacted for the purpose. On the other end, these peers (seeds) S1, S2, S3, . . . , Sn that have been contacted by the peer P receive cancel messages concerning the block requests that have been immediately satisfied by S1, S2, S3, . . . , Sn. This generally happens without threshold mechanisms or block counts, that could be used in order to regulate this practice.

A few clients may enter the end game condition when they have requested all the blocks of the pieces they need, i.e. towards the end of the file downloading process. Others wait until the number of blocks still to be received is lower than the number of blocks in transit, and/or not higher than 20. It is generally agreed that it is good practice to keep the number of pending blocks low (1 or 2 blocks) in order to minimize overhead; this is also due to the fact that, especially if the requested blocks are chosen randomly, the downloading of duplicates is less likely to occur.

For example, FIG. 2 refers to a condition wherein a peer A needs to complete piece 2. FIG. 2 assumes that the blocks in object (the second and the third blocks of the second piece) are available both from peer B and from peer C.

According to a traditional approach, peer A may therefore request the blocks of piece 2 that it lacks both to peer B and to peer C. It is assumed that peer B has answered first, and that it has been more rapid than peer C. In such conditions, peer A obtains the two blocks that it still lacks from peer B and the bandwidth for uploading from peer C is totally unused.

As illustrated in FIG. 2, by resorting to the conventional operative approach of a BitTorrent swarm, some of the uploading resources (those of peer C, referring to the example of FIG. 2) are unused, because the requests of peer A have (already) been satisfied by peer B.

Besides, the peers that, like peer A in the considered example, are waiting for the requested blocks, may not be in the condition of using their upload bandwidth, which instead might be effectively used to increase the download rate of other peers and to meet other requests.

Substantially, referring to the diagram of FIG. 2, in the final stage of downloading, when peer A has requested all blocks of all pieces, the traditional BitTorrent setup requires the peer A itself to send several redundant requests of missing blocks, by sending a request concerning the same blocks to multiple different peers, for example to the peers B and C.

If peer A has sent two identical requests to two or more peers that can provide it with the missing blocks, and the request is (immediately) met, peer A sends a cancel message to the peers acting as suppliers, with the aim of canceling pending requests concerning that specific block.

The example of FIG. 2 refers to the case in which peer A has requested the same set of blocks both to peer B and to peer C. As an example, it has been assumed that peer B was the first to answer, being faster than peer C. As a consequence, requests to peer C are cancelled.

Peer C may however happen to have more resources than B (also from the point of view of speed), and the fact that peer B has answered first may be simply due to the fact that peer C was at the moment in a condition of temporary congestion. Peer A may obtain the missing blocks from peer B, which is on average slower than peer C and that has answered earlier only because peer C was temporarily congested. Eventually peer A may be served by peer B, on the average slower than peer C, resulting in a less than optimal use of the system.

By using, according to various embodiments, a fountain code, it is possible to implement a new version of the end game mode, wherein each block request is different from the others. As a matter of fact, in this case, blocks input into the network originate as an X-ORed combination of several source blocks and, thanks to technologies such as Raptor code, they are more likely to be linearly independent from each other. The blocks that have been input into the network and have been received by any terminal are useful for the decoding process.

Through the fountain code encoding it is possible to implement an evolution of this concept, so that the end game mode becomes applicable to the whole downloading process. In various embodiments, peer A keeps on requesting the blocks of the same piece to multiple different peers. Eventually, among these peers, one is present that is faster than the others and that is the first to respond. Therefore, the peer is not blocked or slowed down while waiting for responses from slow or congested peers.

In a Fountain coding implementation, a further advantage is given by not having to pay specific attention to lost data. Each newly received block adds new information useful for the piece reconstruction and allows the X-OR function progression to go on until the whole piece has been completed. Block requests that respect a progressive mechanism, through a pseudo-random X-OR combination generated by an initial seed, are more (only a little more) than strictly required, but they have the effect of saturating the bandwidth until the piece has been completed.

When the piece is completed, the seeds are informed through a signal message, so that requests for new blocks are dropped at the seed's side. In this way, the bandwidth is used in an optimal way, by sending redundant requests instead of passively waiting for answers from slow or congested peers.

According to various embodiments that are depicted in FIG. 3, the fact that peer B has answered peer A indicating the possession of the missing blocks of piece 2 does not interrupt the requests to peer C, which in turn sends its contribution, speeding up peer A's downloading process.

Block requests (by peer A) are therefore sent to peers, so as to make full use of the upload resources, which would otherwise be unused, with requests relating to the same piece but sometimes referring to different blocks of data (which are requested in a progressive sequence, as it will be described in the following). In other words, the block requests are redundant with reference to the piece, but they are actually different from each other. Consequently, if a piece is formed by N blocks, it is sufficient to receive N blocks, whatever their source or their X-OR combination may be; this is due to the fact that virtually every set of N blocks received is adapted to complete the piece.

It will be appreciated that the operation described by FIG. 3 is not limited to the use during an end game stage, but that it can be activated during the whole downloading process. As a matter of fact, at any moment peer A may not be able to send the request to peer C, because peer C has pieces that peer A has already requested to another peer (for example peer B). If this takes place during the downloading process (not necessarily at its end), according to the traditional approach peer A may not request the same block to more than one peer. On the contrary, according to various embodiments that involve Bit-Fountain coding, it is possible to make use of the bandwidth of peer C by sending DF requests relating to blocks of the same piece. This possibility is particularly useful in a case of network congestion, because in this case peer A requests from the overlay network a few more random blocks, without having to consider missing packets; by adopting the fountain code encoding, there is no longer a strict correspondence between the need of a piece and the need of a specific block of that piece; peer A can request information concerning the same piece both to peer B and to peer C. Though operating in this way, peer A does not ask for copies of the same block, but can asks for different random blocks. As soon as peer A has received the information needed to reconstruct the piece, requests are cancelled. By this procedure, no bandwidth is wasted because the whole available bandwidth is exploited; moreover, in the case one of the peers supplying missing pieces is faster than the others, download is sped up.

When peers request redundant blocks, the peers might complete the piece all of a sudden. The described procedure leads to a synergic effect with an overhead optimization mechanism, considering that each request refers to a different block of information. However, it is generally useless to receive blocks related to a piece that the peer has already completed.

In order to reduce such overhead, when the request has been satisfied the conventional BitTorrent approach sends a message to the other peers acting as sources; it is a cancel message, in order to cancel the now satisfied request, sent to all peers that had initially received the request. The cancel message is repeated for each block and for each connected peer which originally received the request.

In the presently considered embodiments of the disclosed approach, thanks to the use of fountain coding, the different blocks are used indistinctly for the reconstruction of a chunk, because every block is different from the others. The desire is therefore present to communicate that the peer has completed the piece. As a consequence, one single message "I have completed the piece" (HAVE message), sent by the peer which had originally made the request, is sufficient to stop the whole of the information flow. It is therefore possible to eliminate the cancel message for every block request, which was compulsory in the traditional approach, and to synchronize the other peers so as to cancel pending requests through a "have" notification. Such optimization has a twofold positive effect, because it not only reduces the overhead related to the BitTorrent protocol messages, but also enhances the probability to avoid useless chunks being sent through the network.

The result is a single HAVE message instead of multiple CANCEL messages: it is a particularly advantageous feature if the round trip time RTT is comparable to the time required to send one chunk through the network.

FIG. 4 once again refers, for exemplary purposes, to the situation already considered in FIGS. 2 and 3, wherein the peer A has requested a chunk from neighboring peers.

According to the traditional approach depicted in FIG. 4, after having received what is desired, peer A sends a set of cancel messages, each one referred to a previously asked and satisfied request. The messages are sent to every connected peer, so as to cancel each single pending request.

Specifically, FIG. 4 shows peer A informing the seeds about its having completed piece 2 through the message HAVE (Piece 2). In addition, peer A sends a cancel message to eliminate each single satisfied request.

In the approach according to the embodiments depicted in FIG. 5, in a similar situation peer A sends a single message HAVE (Piece 2) to the peers, indicating that peer A now possesses piece 2, eliminating therefore in one move pending requests that are now useless.

It is also possible to improve the request distribution by ranking requests in two levels, for example two levels corresponding to high priority and low priority (the same principle can be extended to multiple priority classes).

In any case, what we wish to highlight is that, during or towards the end of the downloading session, i.e. of the content sharing session, a peer that is completing the file download may (still) have spare bandwidth, that is not used and that on the contrary could exploited in order to satisfy other peers' requests.

To this end, it is possible to not interrupt the uploading of useful chunks. This is in a way an extension of the principle that has already been described with reference to FIG. 3: during uploading, peers never stop sending requests, but not all data responded by the suppliers are actually useful. Substantially, the goal is never to stop uploading data that may be useful (because they are not redundant).

By acting according to this criterion, it is possible to find a better tradeoff between the need to complete a piece as soon as possible and the will to reduce the redundant traffic generated by redundant requests. As a matter of fact, this evolution of the end game mode risks to waste potential resources of the peers acting as content suppliers, by asking them blocks which are useless because they have already been successfully downloaded by the receiver. Moreover, when a peer completes the download of a piece, the previously sent requests of the blocks of that piece are not immediately suppressed; the peers that supply the content are physically remote from the receiving peer, so that the message sent by the latter peer, indicating to cancel a request, may actually reach its destination after the originally requested peer has already sent a redundant block.

Various embodiments provide an evolution of the "pull" approach typical of the traditional BitTorrent system, towards a more optimized "push" approach. This is possible thanks to the use of a DF coding, which can be resorted to for P2P content sharing application.

According to this approach, peers stop uploading the contents at the exact moment when they have satisfied their requests. This is done while trying to meet the constraint by which each peer first asks for piece 1 and, if it is still able to make requests, it asks for another piece 2. Actually, the sooner the peer completes the piece, the earlier it can share it.

This procedure leads to the fact that the buffer of requests at a peer acting as a supplier is always full. If requests relate to the same piece, traffic can be redundant. On the other hand, it is possible to divide requests according to various priority rankings (for example, and for the sake of simplicity, "high" and "low" priority). High priority requests meet the previously described constraint, while low priority requests are those sent to fill the related block request buffers. If the peers acting as information suppliers are already satisfying high priority requests, the overlay network does not waste resources. If the peers acting as information suppliers are simply awaiting new high priority requests, they can satisfy lower priority requests of new pieces.

A risk may exist that, when a peer modifies a low priority request into a high priority request, a redundant traffic may be generated, because the same blocks keep on being requested. This theoretical inefficiency may however be countered by the coding simply respecting the pseudo-random block request progression. If blocks are useful, the client prevents the pure redundancy by simply following the random X-OR progression to neighboring peers.

Figure 6:
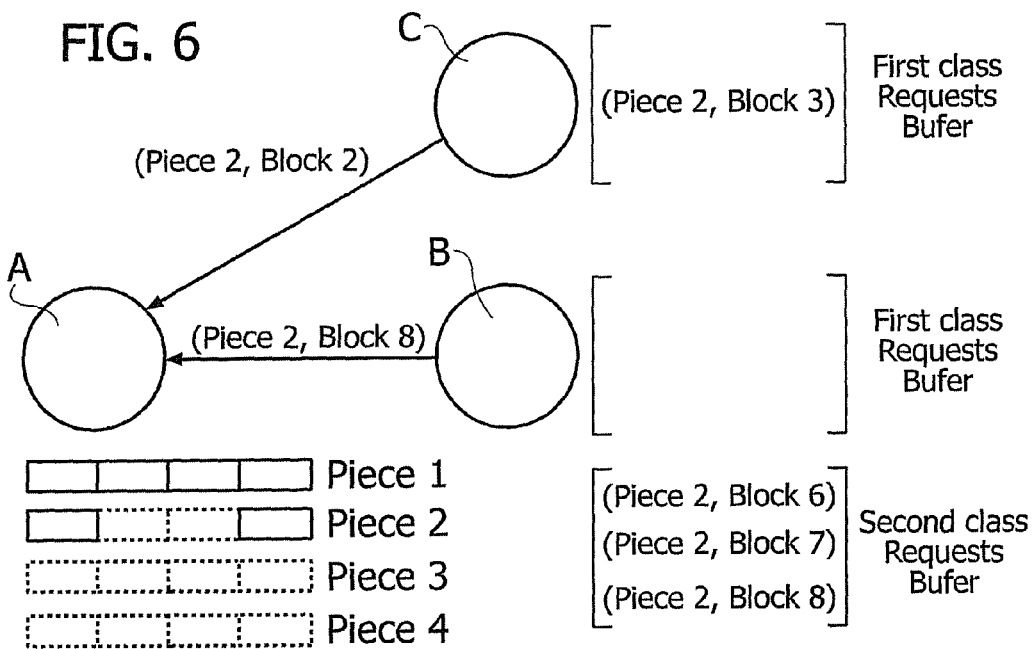
FIG. 6 refers to request ranking in an embodiment of the present invention.

The diagram in FIG. 6 depicts this approach, that does not have any direct counterparts in the traditional BitTorrent solution.

By resorting to a DF coding, the block requests towards neighboring peers follow a progression. If a piece is made by 100 blocks, the requesting peer (for example peer A) may request the first blocks ([1, 50] (X-OR combination) among the 100 blocks) through a low priority request, and then the blocks [50, 150] as a high priority request. The first 100 X-OR combinations that are linearly independent when they are received can successfully complete the piece.

At this point, the previously described HAVE message can be sent (FIG. 5), in this way reducing overhead by deleting all useless requests, both of the first and of the second class. In this respect, the diagram in FIG. 6 refers to a situation wherein peer B has not received high priority requests, and therefore it uses its bandwidth to send low priority requests.

The traditional BitTorrent solution uses the conventional TCP transport control, which controls the issue at transport layer. Moreover, BitTorrent solutions at application layer follow the same approach of TCP at the underlying layer.

By resorting to a fountain approach, and making use of the UDP protocol (which is generally suitable for loss communication channels) it is possible to manage the whole process of network packet loss control at application layer, through adaptive thresholds. In this way it is possible to improve the overall performance of the system, by managing the packet loss control with the aim to send the requests to some peers that can be considered super-peers (an approach already adopted for currently used P2P streaming clients such as Sopcast, PPLIve or VoIP clients such as Skype). In this way it is possible to address requests in order to discover the still available bandwidth within the overlay network. If some information supplier has some spare bandwidth, subsequent requests are sent to these sources. In this way it is possible to improve the overall system efficiency, because it can better be adapted to the traffic load distribution in heterogeneous networks.

With the traditional approach, which is based on the use of TCP, there is no need of a loss control. As a matter of fact, the TCP protocol involves the tracking, by the operating system, of the status of all connections. It is a very slow and expensive approach, where a small number of TCP connections can be open at the same time. This approach is moreover very slow during connection set up, because the status has to be agreed and synchronized between sender and receiver. Moreover, the transmission is rather slow, because each chunk must be acknowledged (ACK) and, if a timeout expires without an ACK, an automatic repeat request (ARW) is generated. Also the round trip time (RTT) of messages may be added to these delays.

By using a UDP communication, which is not designed to work on reliable channels, we obtain a more suitable approach for voice and/or video streaming, because there is no inside strategy to detect packet loss. Various embodiments, however, are adapted to ensure data integrity in any case (for example with a hash check at piece level), by implementing a mechanism to manage packet loss and/or network congestion.

In principle, this issue can be addressed by implementing a timeout/ARQ mechanism at the application level, in the same way as TCP. A smarter approach may be provided with Digital Fountains, by requesting not so much the retransmission of some specific blocks, but rather the retransmission of random blocks (in the described progressive fashion). Since the block request is driven by the piece (and not by the specific block), if one block is lost it is sufficient to simply wait for the following block to fill the missing data of the piece. As soon as enough information is received, pending requests are cancelled, as previously described.

By resorting to these approaches, however, there is a theoretical risk of creating congestion. When the peers always answer to requests, a peer that has made a request may not see any answer because of congestion. If this peer sends other requests, other potential suppliers tend to answer, thus worsening the congestion situation. In order to avoid such a circumstance, it is possible to make use of an adaptive timeout mechanism.

Substantially, a loss window is set up which monitors how much time has elapsed from the sending of the request through a series of adaptive timeouts. In various embodiments, a ranking system may be set up that monitors the time elapsed from the moment the request was sent and the instant the chunk has arrived. In this way it is possible to estimate for example the mean value of the time which was necessary for a seed (or peer) to respond. By calculating the average of those estimated times for all connections, it is possible to decide whether a request is to be considered lost or not, by comparing it with a function of the statistics of first and second order of the above described times in various embodiments (for example mean and variance).

When a request is considered lost, another request is sent (not the same one, as previously mentioned) related to the same piece, to the best connection (identified by the ranking system). At this point, if the block of the old request is received again, it is still considered useful because a fountain code is being used. The request, which is now useless, will be cancelled with the "have" message as discussed before.

Figure 7:
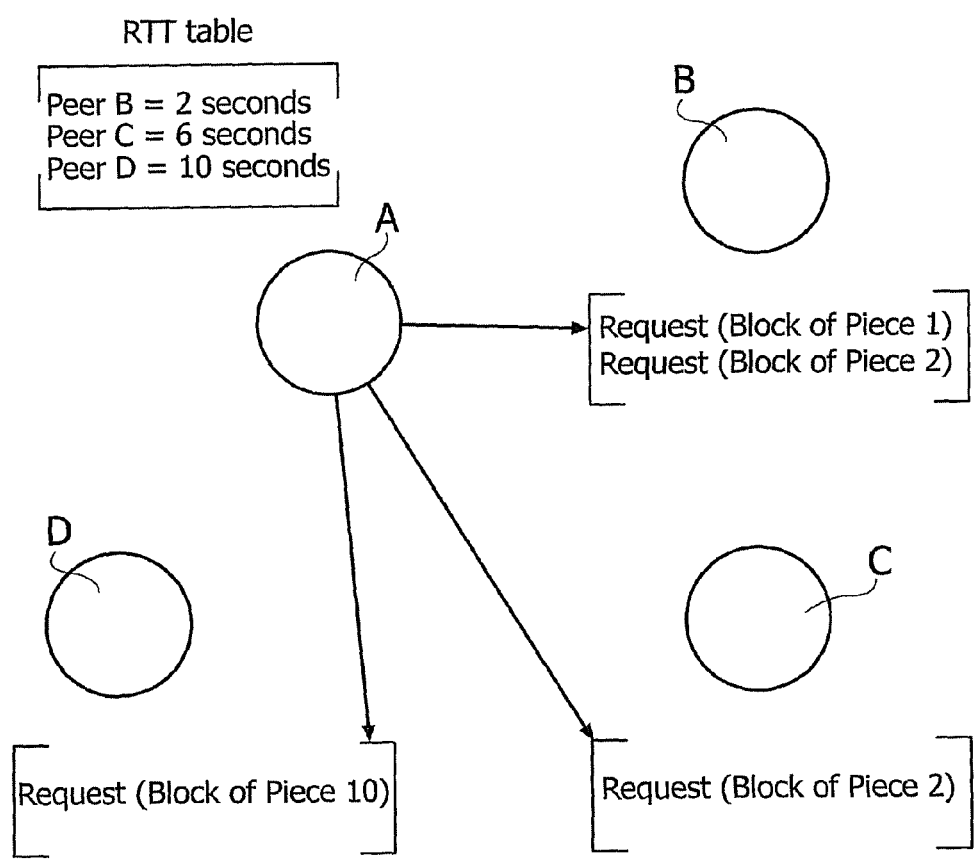
FIG. 7 refers to the control of UDP losses in an embodiment.

FIG. 7 shows that the timeout policy considered herein involves peer A storing in a buffer a list of round trip time (RTT) values for each connection (for example B-C-D). The RTT values in the table are obtained with a function of statistics of the first and second order of the previously described times in various embodiments, for example over ten requests for each connection.

Let us assume that peer C has an RTT value of six seconds. Peer A sends a request to peer C, but it waits for eight seconds, which is more than the usual RTT associated to peer C. It is possible to define a rule whereby the stop request towards C is considered to be lost when the timeout is higher than a threshold level. In this case, the packet from C is late, so peer A sends a new request to the potential fastest supplier, identified in its list as B.

The RTT table is used to store each RTT value of each connection, and to determine (for each connection) when a packet is lost. It can also be used to re-address block requests when a peer supposed to supply this block does not respond.

A rule to define whether a request is old may involve defining a threshold level Thr as the average added to twice the standard deviation calculated over the $RTT_i$ times stored in the table for all N connections available with i=1, ..., N, according to the formula:

$$Thr = \frac{\sum_{i}^{N} RTT_i}{N} + 2 \cdot \frac{\sum_{i}^{N}\left(RTT_i - \frac{\sum_{i}^{N} RTT_i^2}{N}\right)}{N}$$

Such a local knowledge of network behavior allows to determine an order whereby to address requests to the supplier that is presumably the fastest.

FIG. 7 shows a practical use of this criterion. Let us assume that the request sent by peer C is active for example for eight seconds, and can eventually be considered as lost; in this case, peer A sends an alternative request to peer B, which is regarded as faster.

The application in various embodiments is easily understandable because of the presence of two aspects, UDP and Digital Fountains, both integrated into a BitTorrent client which is generally backward compatible (TCP).

In various embodiments, the implementation of fountain codes is modular and, since it proposes a sort of protocol system architecture, any open system wishing to implement an embodiment declares its specifications, so that the applied embodiment can be detected.

In various embodiments it is possible to detect the absence of cancel messages adapted to be identified by a packet sniffer. Besides, any available network system for various operating systems can detect the use of a UDP protocol; as a matter of fact, the type of transport protocol used during an Internet session is written in every IP packet, event though the data field is encrypted, and the sniffer can always identify the packet as UDP or TCP.

Of course, without prejudice to the underlying principles of the invention, the details and the embodiments may vary, even appreciably, with respect to what has been described by way of example only, without departing from the scope of the invention as defined by the annexed claims.

That which is claimed:

1. A method of distributing information content arranged in pieces comprising chunks of bytes sent over a network including first and second peer terminals, the chunks being sent over the network with a connectionless protocol without retransmission of lost packets, the method comprising:
   fountain code encoding the pieces such that the chunks in each piece are XORed until a digital fountain (DF) matrix is not invertible, using the second peer terminal;
   reconstructing a received piece from a combination of linearly independent chunks corresponding to the piece based on the DF matrix with an index of the chunks that have been OXRed at the second peer terminal, using the first peer terminal; and
   identifying missing chunks in received pieces and requesting the missing chunks from at least the second peer terminal, using the first peer terminal.

2. The method of claim 1, wherein the connectionless protocol comprises a user datagram protocol (UDP).

3. The method of claim 1, further comprising sending a message canceling the request for the missing chunks to at least the second peer terminal, using the first peer terminal, once the first peer terminal has received the missing chunks.

4. The method of claim 1, further comprising sending to at least the second peer terminal, using the first peer terminal, a plurality of pseudo-random requests for missing chunks for completing a piece and further requests for further chunks available in the network in excess of a number of chunks included in the piece.

5. The method of claim 4, further comprising arranging the requests for chunks from the first peer terminal into high and low priority ranks allotted to requests for missing chunks and to the further requests for further chunks available in the network, using the first peer terminal.

6. The method of claim 4, further comprising:
   establishing a ranking of the second peer terminal and at least one other peer terminal based upon statistical information relating to time taken to respond to the request for chunks, using the first peer terminal; and
   sending the request for chunks to the second peer terminal and the at least one other peer terminal based upon their respective rankings, using the first peer terminal.

7. The method of claim 6, wherein the second peer terminal and the at least one other peer terminal load contents onto the network after they have satisfied the request for missing chunks.

8. A method of distributing information content arranged in pieces comprising chunks, the method comprising:
   fountain code encoding the pieces such that the chunks in each piece are XORed until a digital fountain (DF) matrix is not invertible;
   reconstructing a received piece encoded from a combination of chunks corresponding to the piece based on the DF matrix with an index of the chunks that have been XORed; and
   identifying missing chunks in received pieces and requesting the missing chunks.

9. The method of claim 8, further comprising sending a message canceling the request for the missing chunks, once in possession of the missing chunks.

10. The method of claim 8, further comprising sending a plurality of pseudo-random requests for missing chunks for completing a piece and further requests for further chunks available in excess of a number of chunks included in the piece.

11. The method of claim 10, further comprising arranging the requests for chunks into high and low priority ranks allotted to requests for missing chunks and to the further requests for further chunks available.

12. The method of claim 10, further comprising:
   establishing a ranking based upon statistical information relating to time taken to respond to the request for chunks; and
   sending the request for chunks to a peer terminal and at least one other peer terminal based upon their respective rankings.

13. A first peer terminal configured to receive information content arranged in pieces comprising chunks for a network including a second peer terminal, the chunks to be sent over the network with a connectionless protocol without retransmission of lost packets, and with the second peer terminal being used to fountain code encoding the pieces such that the chunks in each piece are XORed until a digital fountain (DF) matrix is not invertible, the first peer terminal comprising:
   a processor configured to
      reconstruct a received piece encoded with a fountain code from a combination of linearly independent chunks corresponding to the piece based on the DF matrix with an index of the chunks that have been XORed at the second peer terminal; and
      identify missing chunks in received pieces and request the missing chunks from the second peer terminal.

14. The first peer terminal of claim 13, wherein the connectionless protocol comprises a user datagram protocol (UDP).

15. The first peer terminal of claim 13, wherein said processor is further configured to send a message canceling the request for the missing chunks to the second peer terminal once said processor has received the missing chunks.

16. The first peer terminal of claim 13, wherein said processor is further configured to send, to the second peer terminal, a plurality of pseudo-random requests for missing chunks for completing a piece and further requests for further chunks available in the network in excess of a number of chunks included in the piece.

17. The first peer terminal of claim 16, wherein said processor is also configured to arrange the requests for chunks into high and low priority ranks allotted to requests for missing chunks and to the further requests for further chunks available in the network.

18. The first peer terminal of claim 16, wherein said processor is further configured to:
   establish a ranking of the second peer terminal and at least one other peer terminal based upon statistical information relating to time taken to respond to the request for chunks; and send the request for chunks to the second peer terminal and the at least one other peer terminal based upon their respective rankings.

19. A non-transitory computer readable medium containing instructions that, when executed, cause a first peer terminal to distribute information content arranged in pieces comprising chunks to be sent over a network also including a second peer terminal, the chunks to be sent over the network with a connectionless protocol without retransmission of lost packets, and with the second peer terminal being used to fountain code encoding the pieces such that the chunks in each piece are XORed until a digital fountain (DF) matrix is not invertible, by at least:

reconstructing a received piece encoded with a fountain code from a combination of linearly independent chunks corresponding to the piece based on the DF matrix with an index of the chunks that have been XORed at the second peer terminal; and identifying missing chunks in received pieces and requesting the missing chunks from the second peer terminal.

20. The non-transitory computer readable medium of claim 19, wherein the connectionless protocol comprises a user datagram protocol (UDP).

21. The non-transitory computer readable medium of claim 19, also containing instructions to cause the first peer terminal to send a message canceling the request for the missing chunks to the second peer terminal once in possession of the missing chunks.

22. The non-transitory computer readable medium of claim 19, also containing instructions to cause the first peer terminal to send to the second peer terminal a plurality of pseudo-random requests for missing chunks for completing a piece and further requests for further chunks available in the network in excess of a number of chunks included in the piece.

23. The non-transitory computer readable medium of claim 22, also containing instructions to cause the first peer terminal to arrange the requests for chunks into high and low priority ranks allotted to requests for missing chunks and to the further requests for further chunks available in the network.

24. The non-transitory computer readable medium of claim 22, also containing instructions to cause the first peer terminal to:

establish a ranking of the second peer terminal and at least one other peer terminal based upon statistical information relating to time taken to respond to the request for chunks; and send the request for chunks to the second peer terminal and the at least one other peer terminal based upon their respective rankings.

\* \* \* \* \*